United States Patent [19]
Nelson

[11] 4,046,210
[45] Sept. 6, 1977

[54] MULTIPLE DRIVE AXLE ASSEMBLY

[75] Inventor: Robert K. Nelson, Shaker Heights, Ohio

[73] Assignee: Eaton Corporation, Cleveland, Ohio

[21] Appl. No.: 580,002

[22] Filed: May 22, 1975

[51] Int. Cl.$^2$ ............................................. B60K 41/02
[52] U.S. Cl. ............................. 180/24.1; 192/84 PM; 74/710
[58] Field of Search ...................... 180/24, 24.1, 24.09, 180/24.08, 24.11, 24.12; 192/103 F, 84 D; 74/866, 665 P, 665 F, 665 G, 856, 710, 711

[56] References Cited

U.S. PATENT DOCUMENTS

| | | | |
|---|---|---|---|
| 2,064,262 | 12/1936 | Keese | 74/710 |
| 2,195,480 | 4/1940 | Buchner | 180/24.1 |
| 2,693,244 | 11/1954 | Rockwell et al. | 180/24.09 |
| 2,805,586 | 9/1957 | Lucas | 180/24.09 |
| 2,914,128 | 11/1959 | Christie | 180/24.1 |
| 3,000,456 | 9/1961 | Christie | 180/24.09 |
| 3,706,350 | 12/1972 | Bokovoy | 180/24.09 |
| 3,894,446 | 7/1975 | Shoy et al. | 192/103 F |
| 3,915,271 | 10/1975 | Harper | 192/84 P |

*Primary Examiner*—Philip Goodman
*Assistant Examiner*—Terrance L. Siemens
*Attorney, Agent, or Firm*—Teagno & Toddy

[57] ABSTRACT

A drive axle assembly, such as a tandem axle, is provided for transmitting torque from a main drive shaft to at least one of a first drive axle and a second drive axle. An input shaft is driven by the main drive shaft and has a helical gear in fixed engagement therewith, and in driving engagement with the first drive axle. An output shaft is disposed coaxially with the input drive shaft and includes clutch means in fixed engagement with the output shaft. The clutch means includes a set of clutch teeth which, when the clutch means is shifted into operative position, engages a mating set of clutch teeth on the helical gear. Thus, under normal operating conditions such as on dry pavement, all of the torque from the main drive shaft is transmitted to the first drive axle, but under abnormal, slippery conditions the clutch means may be shifted into engagement with the helical gear so that the torque from the main drive shaft is divided between the first and second drive axles, minimizing the likelihood of wheel "spin out." There may be included sensors for sensing the rotational speed of each of the drive axles, as well as an actuator which shifts the clutch into engagement with the helical gear in response to an indication that the sensors have sensed a rotational speed difference between the drive axles which is in excess of a predetermined limit. If such an automatic actuating arrangement is utilized, it is preferable to include a time delay arrangement so that the clutch will remain in its operative condition for a predetermined period of time after the input shaft and output shaft have been locked and the rotational speed difference reduced to zero.

10 Claims, 3 Drawing Figures

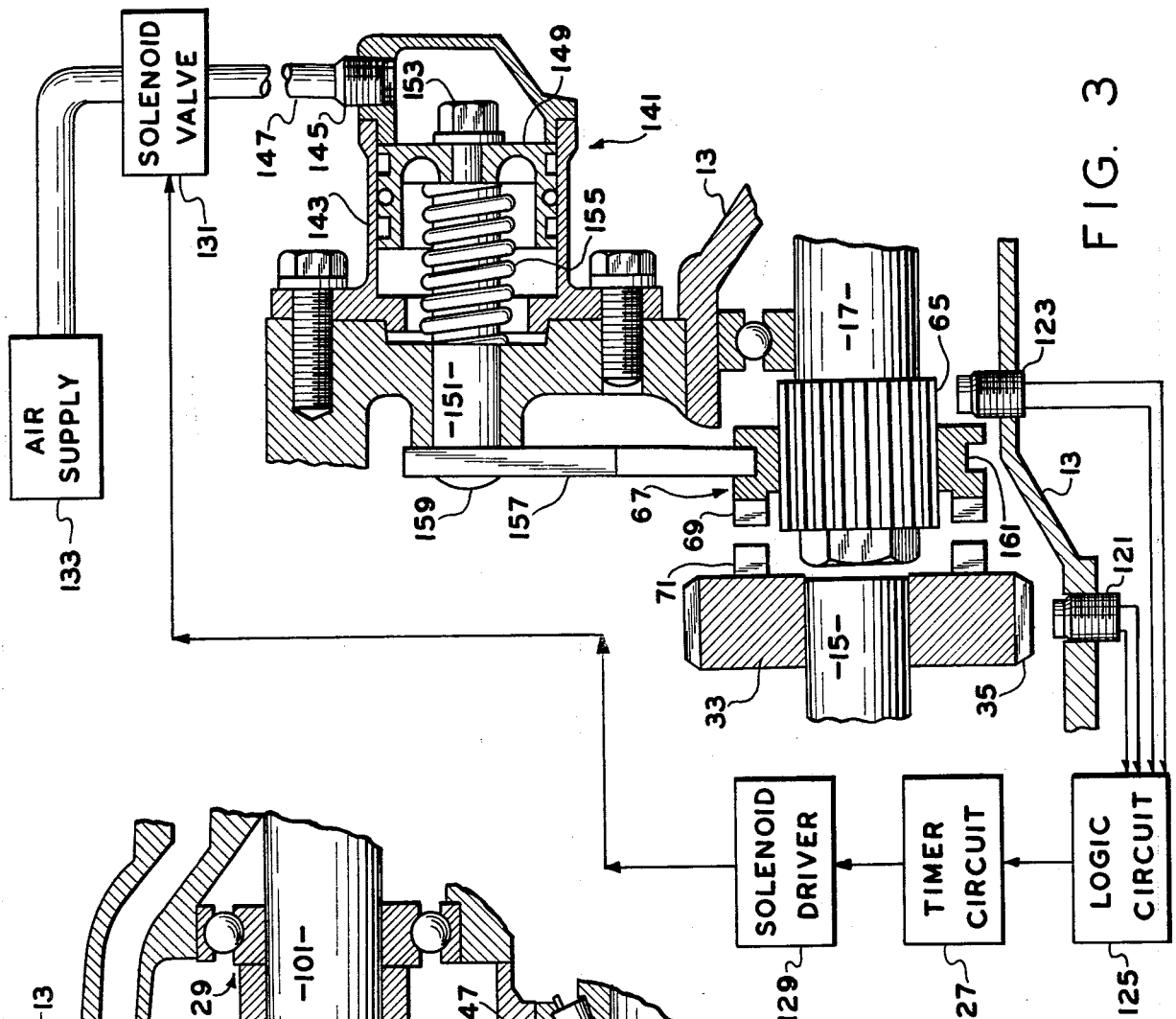
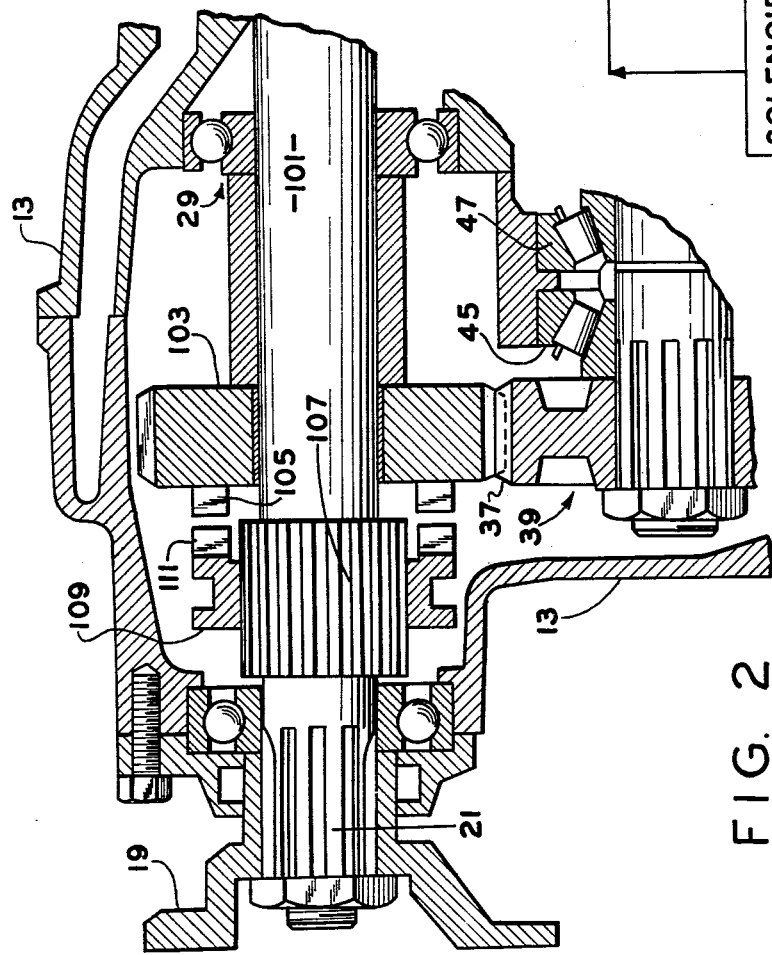
FIG. 3
FIG. 2

MULTIPLE DRIVE AXLE ASSEMBLY

BACKGROUND OF THE DISCLOSURE

The present invention relates to a drive axle assembly for a vehicle having multiple drive axles, and more particularly, to such an assembly which is capable of transmitting torque, selectively, to less than all of the drive axles.

The present invention is generally applicable to any vehicle drive system which includes multiple drive axles which are normally intended to rotate at about the same speed. However, the present invention is especially adapted for use with tandem axle assemblies and will be described in connection therewith.

The essence of a tandem device is its ability to drive more than one drive axle. This is typically accomplished by means of a power (or torque) divider, usually in the form of a differential in which one of the differential side gears transmits a certain percentage of the input torque to the first drive axle, while the other differential side gear transmits the remaining torque by means of an output shaft to a second drive axle or to a second tandem axle assembly which can then divide the remaining torque between second and third drive axles. A tandem axle assembly of the type well known in the art is illustrated in U.S. Pat. No. Re. 25,269 (originally U.S. Pat. No. 3,000,456), assigned to the assignee of the present invention, and which is incorporated herein by reference.

Tandem axle assemblies have become increasingly popular for use in the trucking industry, especially for vehicles subjected to relatively heavy loads, because of their ability to provide multiple pairs of driving wheels. However, it is a feature of tandem axle assemblies that torque is continuously being transmitted to both the adjacent (first) drive axle as well as the subsequent (second) drive axle, which is desirable under conditions of extremely heavy load or under unfavorable road conditions (mud, ice, etc.) Under such road conditions, a common problem with tandem axle assemblies has been the spin out which occurs when one or more of the drive wheels loses traction, causing the particular wheels as well as their associated drive mechanism all the way back to the differential to spin out to a higher rotational speed than the other driving elements of the system.

On many types of vehicles, especially those generally referred to by the designation "6 × 4", it may not be necessary to have torque continuously transmitted to both the rear drive axles, but instead, to transmit all of the driving torque to one of the drive axles under normal operating conditions (lightly loaded, dry highway), and have the ability to divide the torque among multiple drive axles in response to certain driving conditions. This is especially desirable in view of the manufacturing costs and complexity of conventional tandem axle assemblies utilizing continuous torque dividing mechanisms such as differential gear sets.

A drive axle assembly which transmits torque between first and second drive axles only when really necessary would have the additional advantage of prolonging the operating life of all of the driving components and gearing associated with the second drive axle, as they would be in driving operation only infrequently, and for relatively short periods of time.

SUMMARY OF THE INVENTION

Accordingly, it is an object of the present invention to provide a drive axle assembly for use with vehicles utilizing multiple drive axles which, under normal conditions, transmits all of the driving torque to one of the drive axles and divides the torque between the drive axles under only abnormal conditions, such as when it is necessary to do so in order to avoid spin out.

It is another object of the present invention to provide a drive axle assembly in accordance with the above-stated object, wherein the occasional division of input torque may occur in response to a manual selection by the operator, or may occur automatically in response to the existence of certain driving conditions.

The above and other objects of the invention, which will become apparent upon a reading of the following detailed description, are accomplished by the provision of a drive axle assembly for transmitting torque from a main drive shaft to at least one of a first drive axle and a second drive axle. The assembly has an input shaft in driving engagement with the main drive shaft and an output shaft means in driving engagement with the second drive axle. A gear means is associated with one of the input shaft and the output shaft means and is in driving engagement with the first drive axle. A clutch means is in fixed engagement with the other of the input shaft and the output shaft and is operable to be shifted into engagement with the gear means to divide torque from the main drive shaft between the first drive axle and the second drive axle. A means is provided for shifting the clutch means into engagement with the gear means.

In accordance with another aspect of the present invention, a means is provided for sensing the rotational speed difference between the first drive axle and the second drive axle and there is an actuator for actuating the shifting means, thus engaging the clutch means whenever the rotational speed difference exceeds a predetermined limit. When using this type of automatic actuation of the shifting means and clutch means, it is preferable to include, as part of the actuating means, a time delay arrangement for maintaining the shifting means in an actuated condition for a predetermined time period after the rotational speed difference drops below the predetermined limit, to prevent the shifting means from oscillating between the actuated and unactuated positions, such as when the set of wheels on the full time drive axle are on ice or in mud.

BRIEF DESCRIPTION OF THE DRAWINGS

FIG. 2 is a fragmentary vertical section, similar to FIG. 1 and on the same scale, illustrating an alternative embodiment of the present invention.

FIG. 3 is a fragmentary, partly schematic view of the shifting mechanism which may be utilized with the present invention, taken on a different plane than FIG. 1.

DESCRIPTION OF THE PREFERRED EMBODIMENTS

Figure 1:
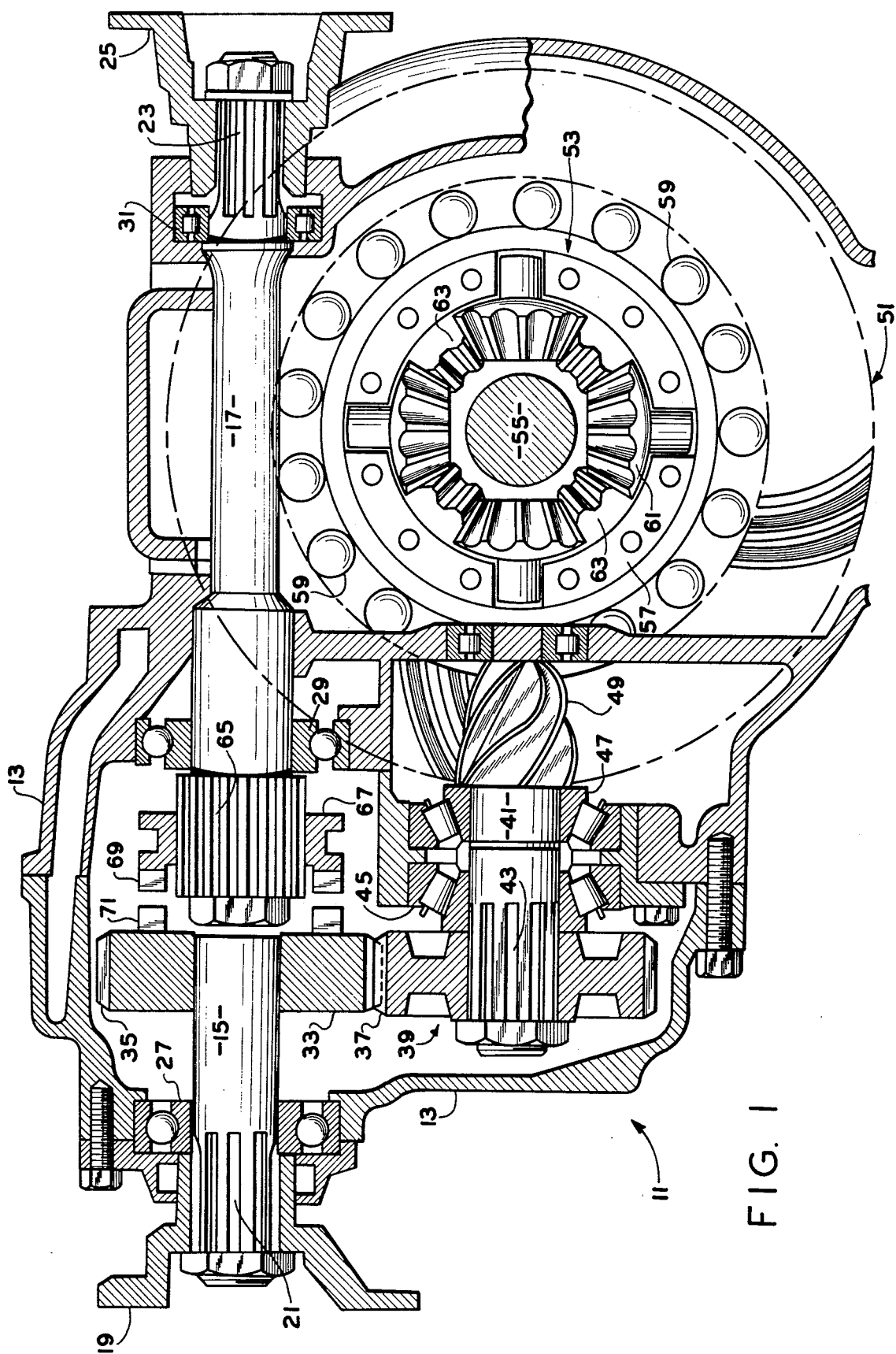
FIG. 1 is a longitudinal vertical section of a tandem axle mechanism utilizing the teachings of the present invention.

Referring now to the drawings, which are for the purpose of illustrating preferred embodiments of the invention and not for limiting the same, FIG. 1 is a cross section of a tandem axle mechanism, generally designated 11. The mechanism 11 comprises a housing 13, within which is a pair of axially-aligned shaft members 15 and 17. The shaft member 15 is provided with a suitable universal coupling means 19 for connection with a main drive shaft or the like (not shown), to deliver input torque to the shaft member 15. The forward end of shaft member 15 is provided with a spline portion 21 for non-rotatable mounting of the universal coupling 19 thereon. In a similar fashion, the rearward end of the shaft member 17 is provided with a spline portion 23 for non-rotatable mounting of a universal coupling 25 thereon. The shaft member 15 is rotatably supported within the housing 13 by a set of suitable anti-friction bearings 27, while the shaft member 17 is rotatably supported within the housing 13 by bearing sets 29 and 31.

Shaft member 15 transmits input torque from the main drive shaft to a helical gear 33, which is fixed relative to the shaft member 15, preferably by being keyed thereto. The helical gear 33 has, about its outer surface, a set of gear teeth 35 which mesh with a mating set of gear teeth 37 disposed about a pinion gear 39. The pinion gear 39 is fixedly mounted on the forward end of a pinion shaft 41 by means of a spline connection 43, the pinion shaft 41 being rotatably supported within the housing 13 by sets of thrust bearings 45 and 47. The pinion shaft 41 terminates, opposite the spline connection 43 in a drive pinion 49 which transmits torque to a ring gear 31. The ring gear 51 transmits the torque, by means of a differential 53 to a drive axle, including a right axle shaft 55 and a left axle shaft (not shown in FIG. 1). The differential 53 includes a carrier or spider 57 secured to the ring gear 51 by means of suitable bolts or rivets 59. The spider 57 includes a pluralty of planet pinions 61 in meshing engagement with a right differential side gear 63 and a left differential side gear (not shown).

The shaft member 17 has, at its forward end (i.e., opposite spline portion 23), a set of external splines 65 on which is slidably mounted a clutch member 67. Extending forwardly from the clutch member 67 is a set of clutch teeth 69, positioned for engagement with a mating set of clutch teeth 71 provided on the rearward face on the helical gear 33.

Under normal operating conditions of the tandem axle mechanism 11, the clutch member 67 is in the position shown in FIG. 1, such that all of the input torque transmitted to shaft member 15 is, in turn, transmitted to helical gear 33, pinion gear 39, pinion shaft 41, ring gear 51, differential 53 and finally to the drive axle. When the clutch member 67 is shifted forwardly so that clutch teeth 69 are in driving engagement with clutch teeth 71, the torque transmitted to shaft member 15 is evenly divided between the previously-described power path leading to the first drive axle and the shaft member 17, leading to a second drive axle.

Referring now to the alternative embodiment illustrated in the fragmentary cross section of FIG. 2, the primary differences from the tandem axle mechanism of FIG. 1 relate to the direction of the power path under normal operating conditions. The shaft members 15 and 17 of FIG. 1 have been replaced in FIG. 2 by a single shaft member 101 which is able to receive input torque from the main drive shaft in the same manner as shaft member 15 and to transmit torque to a second drive axle in the same manner as shaft member 17. Freely rotatable about the shaft member 101 is a helical gear 103 having a set of clutch teeth 105 extending forwardly from the helical gear 103. Adjacent the helical gear 103 is a set of external splines 107 on which is slidably mounted a clutch member 109, having a set of clutch teeth 111 positioned for engagement with the clutch teeth 105. It should be noted that the power path from helical gear 103 to the first drive axle is the same as that from helical gear 33 to the first drive axle in FIG. 1.

Under normal operating conditions of the tandem axle mechanism, the clutch member 109 is in the position shown in FIG. 2, such that all of the input torque transmitted to the shaft member 101 is transmitted to the second drive axle. However, when the clutch member 109 is shifted rearwardly so that clutch teeth 111 are in driving engagement with clutch teeth 105, the torque transmitted to the shaft member 101 is evenly divided between the power path leading to the first drive axle and that leading to the second drive axle.

Whether utilizing the embodiment of FIG. 1 or that of FIG. 2, it is generally preferably to shift the clutch member 67 (or 109) and engage the clutch teeth automatically in response to a predetermined condition, rather than relying on manual actuation of the clutch by the operator. Typically, the predetermined condition used for automatically dividing the torque would be the occurrence of a rotational speed differential between the first and second drive axles in excess of a predetermined limit.

Referring now to the view of FIG. 3, adapted for use with the embodiment of FIG. 1, there is shown, partly in schematic form, an arrangement for automatically shifting the clutch member 67 into its actuated position upon the occurrence of an excessive rotational speed difference between the drive axles.

Extending through the housing 13 is a pair of magnetic pickups 121 and 123 threadedly adjusted to define magnetic gaps with gear teeth 35 and splines 65, respectively. Magnetic pickups of the type utilized herein are well known in the art but, briefly, operate on the principle that ferromagnetic pole pieces disposed in the sensing end of the magnetic pickup describes a magnetic flux pattern which is alternately collapsed and built up as the lines of flux are cut by the gear teeth 35 or splines 65. The expanding and collapsing magnetic field induces an alternating current in a coil within the pickup, the current having a frequency proportional to the speed of the rotation of the adjacent rotating member (helical gear 33 or shaft member 17). The current signals generated at the magnetic pickup 121 and 123 are fed to a logic circuit 125 wherein the incoming signals may be converted from sine wave form to pulse form, then converted to a direct current signal having a voltage proportional to the frequency of the alternating signal and finally, compared to determine if the voltage difference (proportional to the rotational speed difference) exceeds a predetermined limit. If so, an actuation signal is transmitted to a timer circuit 127 which includes an internal timer to make sure that the actuation signal continues for at least a predetermined period of time, such as 30 seconds, after the logic circuit 125 no longer senses a rotational speed difference between the drive axles. The signal from the timer circuit is fed to a solenoid driver 129 which transmits an appropriate signal to a solenoid valve 131. Actuation of the solenoid valve 131 permits pressurized air from an air supply 133 to be fed to an actuating mechanism, generally designated 141. The actuating mechanism 141 includes a cylinder housing 143, attached to the tandem axle housing 13 and threadedly receiving a pneumatic fitting 145 to which is attached an airline 147 for pressurizing the inside of cylinder housing 143. Slidably engaging the inside surface of housing 143 is a piston 149 fixedly attached to a threaded end of a push rod 151 by means of a nut 153. The piston 149 is biased toward the position shown in FIG. 3 by a biasing spring 155. At the end of push rod 151, opposite disposed from the piston 149, is a shift fork 157 fixedly attached to the push rod 151 by means of a rivet 159. The shift fork 157 is provided with a semi-circular surface (not shown) adapted to engage an angular groove 161 in the clutch member 67. Thus, when air pressure is supplied to the cylinder housing 143 through airline 147 which exerts a force against piston 149 sufficient to overcome the biasing force of spring 155, the push rod 151 is moved to the left in FIG. 3 causing the shift fork 157 to slide clutch member 67 along the splines 65 until the clutch teeth 69 engage mating clutch teeth 71.

The invention has been described in detail sufficient to enable one of ordinary skill in the art to make and use the same. Modifications and alterations of the preferred embodiment will occur to others upon a reading of the specification and it is my intention to include all such modifications and alterations insofar as they come within the scope of the appended claims.

I claim:

1. A drive axle assembly for selectively transmitting torque from a main drive shaft to one of a first drive axle and a second drive axle and to both the first and second drive axles, comprising:
   a. input shaft means in driving engagement with said main drive shaft;
   b. output shaft means in driving engagement with said second drive axle, said output shaft coaxial with said drive shaft;
   c. gear means associated with one of said input shaft means and said output shaft means, said gear means being in driving engagement with said first drive axle;
   d. clutch means in relatively non-rotatable engagement with the other of said input shaft means and said output shaft means and operable to be shifted into engagement with said gear means to divide the torque from said main drive shaft between said first drive axle and said second drive axle;
   e. means for shifting said clutch means into engagement with said gear means;
   f. means for sensing the rotational speed difference between said first drive axle and said second drive axle; and
   g. means for actuating said shifting means in response to said rotational speed difference exceeding a predetermined limit.

2. A drive axle assembly as defined in claim 1 wherein said gear means includes a helical gear in fixed engagement with said input shaft means.

3. A drive axle assembly as defined in claim 2 wherein said helical gear includes a set of clutch teeth positioned for driving engagement with said clutch means when said clutch means is shifted into engagement with said gear means.

4. A drive axle assembly as defined in claim 1 wherein said input shaft means and said output shaft means are fixed to be relatively non-rotatable, said gear means is associated with said output shaft means and said clutch means is in engagement with said input shaft means.

5. A drive axle assembly as defined in claim 1 wherein said input shaft means and said output shaft means comprise an integral shaft member, and said gear means includes a helical gear freely rotatable relative to said shaft member.

6. A drive axle assembly as defined in claim 1 wherein said actuating means includes time delay means for maintaining said shifting means in an actuated condition for a predetermined time period after said rotational speed difference becomes less than said predetermined limit.

7. A drive axle assembly for transmitting torque from a main drive shaft to a first drive axle and, selectively, to both a first and a second drive axle, comprising:
   a. input shaft means adapted for driving engagement with said main drive shaft;
   b. output shaft means, disposed generally coaxially with said input shaft means and adapted for driving engagement with said second drive axle;
   c. a gear member in fixed engagement with said input shaft and including a first set of clutch teeth;
   d. a pinion shaft extending generally parallel to said input shaft means and transversely spaced apart therefrom;
   e. a pinion gear in fixed engagement with one end of said pinion shaft and in toothed engagement with said gear member;
   f. a differential gear set including a pair of differential side gears;
   g. gear means associated with said pinion shaft for transmitting torque from said pinion shaft to said differential gear set;
   h. said first drive axle including a pair axle shafts, one of said axle shafts being in fixed engagement with one of said differential side gears and the other of said axle shafts being in fixed engagement with the other of said differential side gears;
   i. clutch means in splined engagement with said output shaft means, adjacent said gear member, and including a second set of clutch teeth;
   j. means for selectively shifting said clutch means to cause operative engagement between said first and second sets of clutch teeth, to divide the torque transmitted to said input shaft means between said first and second drive axles; and
   k. means for sensing the rotational speed difference between said first and second drive axles and means for actuating said shifting means in response to said rotational speed difference exceeding a prededetermined limit.

8. A drive axle assembly as defined in claim 7 wherein said actuating means includes time delay means for maintaining said shifting means in an actuated condition for a predetermined time period after said rotational speed difference becomes less than said predetermined limit.

9. A drive axle assembly for transmitting torque from a main drive shaft, selectively, to a first drive axle and to a second drive axle, comprising:
   a. shaft means having one end thereof adapted for driving engagement with said main drive shaft and the other end thereof adapted for driving engagement with said second drive axle;
   b. a gear member freely rotatable relative to said shaft means and including a first set of clutch teeth;
   c. clutch means in splined engagement with said shaft means, adjacent said gear member, and including a second set of clutch teeth;
   d. means for selectively shifting said clutch means to cause operative engagement between said first and second sets of clutch teeth;

e. a pinion shaft extending generally parallel to said shaft means and transversely spaced apart therefrom;
f. a pinion gear in fixed engagement with one end of said pinion shaft and in toothed engagement with said gear member;
g. a differential gear set including a pair of differential side gears;
h. gear means associated with said pinion shaft for transmitting torque from said pinion shaft to said differential gear set;
i. said first drive axle including a pair of axle shafts, one of said axle shafts being in fixed engagement with one of said differential side gears and the other of said axle shafts being in fixed engagement with the other of said differential side gears;
j. said operative engagement between said first and second sets of clutch teeth causing a division of torque transmitted to said shaft means between said first and second drive axles; and
k. means for sensing the rotational speed difference between said first and second drive axles and means for actuating said shifting means in response to said rotational speed difference exceeding a predetermined limit.

10. A drive axle assembly as defined in claim 9 wherein said actuating means includes time delay means for maintaining said shifting means in an actuated condition for a predetermined time period after said rotational speed difference becomes less than said predetermined limit.

* * * * *